Oct. 24, 1939.  C. C. HARRAH  2,176,964

VEHICLE

Filed Feb. 28, 1938  2 Sheets-Sheet 1

INVENTOR.
CLAYTON C. HARRAH
BY McConkey, Dawson & Booth
ATTORNEYS

Oct. 24, 1939.  C. C. HARRAH  2,176,964
VEHICLE
Filed Feb. 28, 1938   2 Sheets-Sheet 2

INVENTOR.
CLAYTON C. HARRAH
BY McConkey, Dawson & Booth
ATTORNEY.

Patented Oct. 24, 1939

2,176,964

UNITED STATES PATENT OFFICE 2,176,964

VEHICLE

Clayton C. Harrah, Niles, Mich., assignor to National Standard Company, Niles, Mich., a corporation of Michigan Application February 28, 1938, Serial No. 192,914

3 Claims. (Cl. 296—44)

This invention relates to vehicles and other structures having doors, and particularly to providing seals for such doors, and is illustrated as embodied in an automobile body having a door seal yieldingly compressed (when the door is closed) between a part of the door and a part of the door frame.

An object of the invention is to provide an effective door seal which will serve also as a gutter to conduct rain away from the door opening. Preferably the seal is in the form of an outwardly-facing channel, which serves the function of a gutter and the walls of which are resiliently held in sealing engagement with the door and the door frame respectively.

Another object of the invention is to reinforce such a door seal with spring metal material, preferably in the form of an open-mesh spring wire structure. The most effective reinforcement consists of a braid of spring steel wires each extending the full length of the braid and carried diagonally back and forth across the braid over and under the other wires. This reinforcement is imbedded in suitable rubber material, the whole being formed and set in the form of a channel. The channel so formed is especially advantageous in the readiness with which it can be carried around curves and corners.

Another object of the invention is to provide a compact and effective combination of such a channel-section seal and gutter with the cooperating portions of the door and door frame.

The above and other objects and features of the invention will be apparent from the following description of the illustrative constructions shown in the accompanying drawings, in which.

Figure 1:
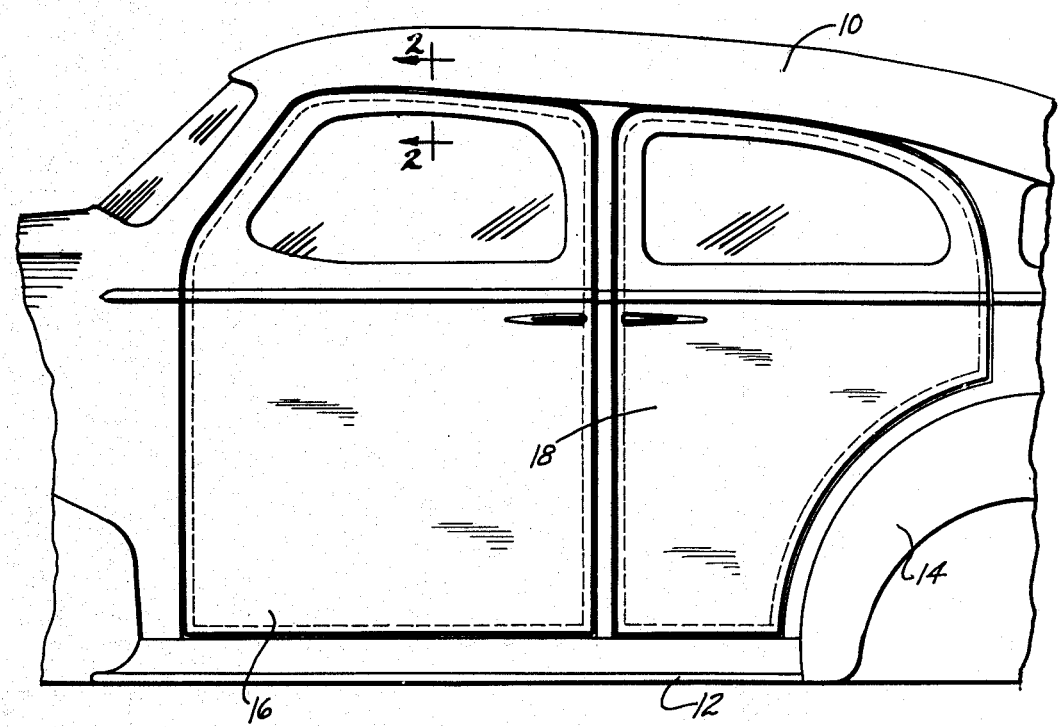
Figure 1 is a partial side elevation of an automobile with dotted lines showing the disposition of the combined gutter and seal about the edges of the doors.

Figure 1 shows an automobile body including the usual top 10 and running board 12, with suitable fenders or the like 14. The body is formed with the usual openings for doors 16 and 18, of any desired construction.

Figure 2:
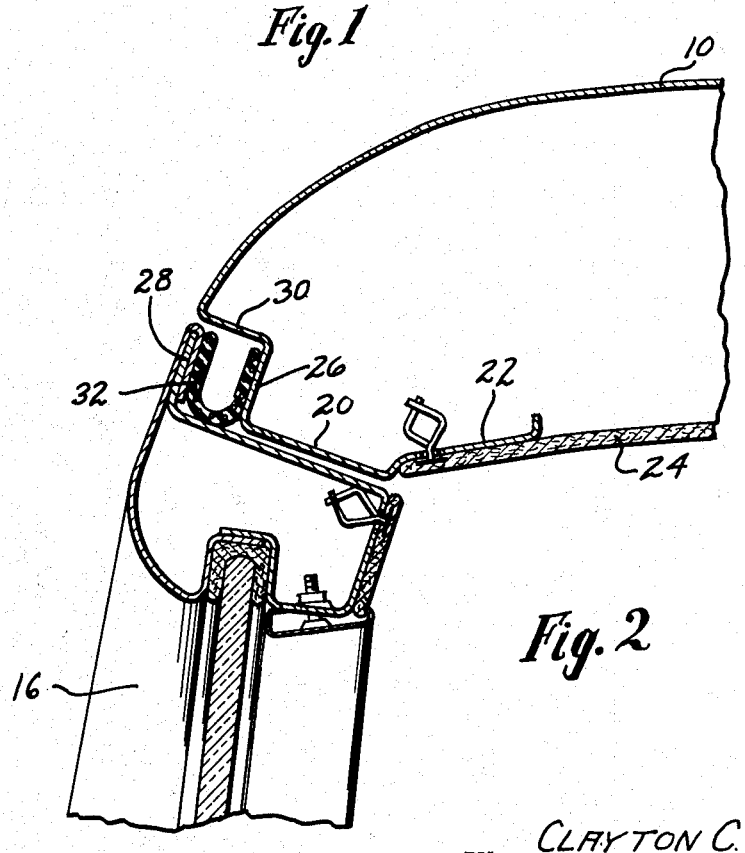
Figure 2 is a partial section on the line 2—2 of Figure 1 on an enlarged scale.
Figure 3:
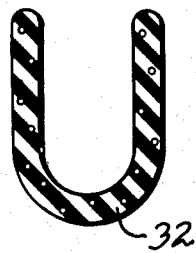
Figure 3 is a further enlarged section through the combined seal and gutter.

In the particular arrangement illustrated in Figures 1 and 2, the door opening is defined by a part 20 which is integral with the exterior of the body, as for example the top 10, and which is shown with an interior flange or extension 22 to which is shown attached one of the interior finish panels 24. This part 20 which defines the door opening is integrally continued as a part 26 peripherally surrounding the opening and which is in a plane paralleling the door, but which is spaced inwardly from the body exterior sufficiently so that there is a space between it and a flange 28 formed on the door. The flange 28 is so arranged that it merges into the curvature of the exterior of the body. The body panel is continued outwardly from the part 26 as a section 30 which overhangs the flange 28 and which connects to the top panel 10.

Between the flange 28 and the part 26 which (when the door is closed) parallels the flange but is spaced therefrom, is arranged a combination seal and gutter 32, in the form of an outwardly-facing gutter channel the walls of which resiliently seal against flange 28 and part 26 of the body.

Figure 4:
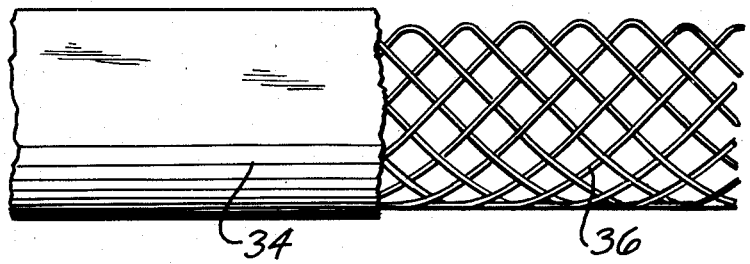
Figure 4 is a partial elevation thereof with part of the rubber broken away.

The combination seal and gutter 32 is preferably of rubber material 34 (Figures 4 and 6) having a spring metal reinforcement imbedded therein. The best reinforcement for this purpose is an open spring-wire mesh, preferably an expanded braid of spring steel wires 36 (Figures 4 and 6) each of which extends the full length of the braid, and which are carried diagonally back and forth across the braid over and under each other.

Figure 5:
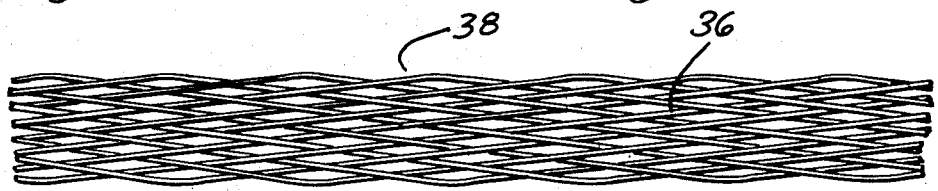
Figure 5 is a partial plan of the unexpanded wire braid.
Figure 6:
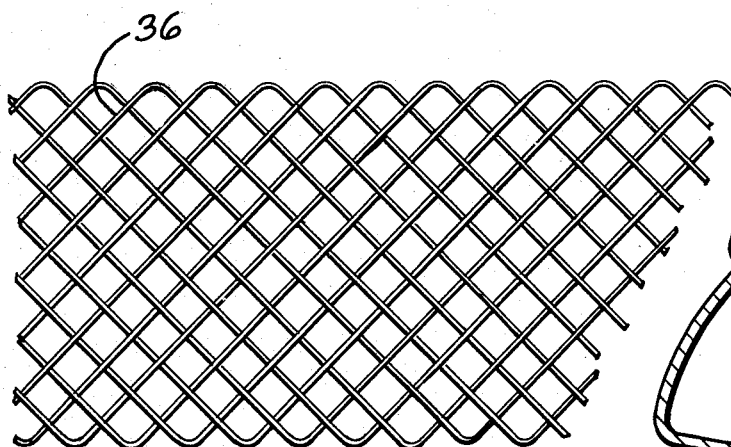
Figure 6 is a partial plan view of the expanded wire braid.

The channel may be made up by taking a braid 38 (Figure 5) of spring steel wires 36, expanding it to give an open mesh as shown in Figure 6, imbedding the expanded braid in suitable rubber material which is afterwards cured in the usual way. The channel is formed either before or after curing the rubber material, by means of suitable formed rolls (not shown) which bend up the walls of the channel under sufficient pressure to "set" the wire reinforcement permanently in the shape of a resilient channel.

Figure 7:
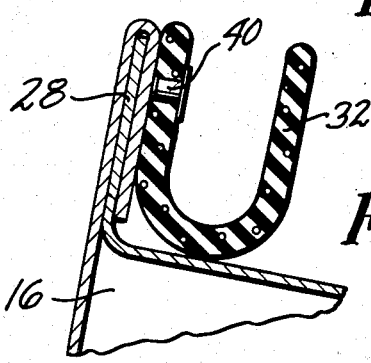
Figure 7 is a partial section showing one method of securing the braid to the door flange by rivetform elements passed through holes in the rubber between interstices of wires and resistance welded to the door flange.
Figure 8:
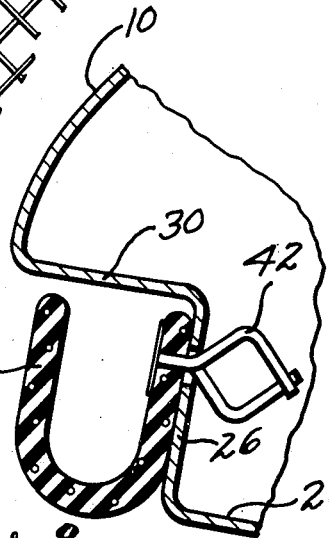
Figure 8 is a partial section showing the combination gutter and seal secured to the door frame by means of spring wire clips.

As shown in Figure 7, the channel may be mounted in place by attaching one wall to the flange 28 of the door, for example by means of rivets 40 the ends of which are resistance-welded to the flange 28. If preferred, the channel may be attached to the door frame instead of the door, as shown in Figure 8, one channel wall being attached to the frame part 26 by suitable clips 42 passing through holes in the body stamping.

It will be seen that when the door is closed, the walls of the channel seal against the door and the frame part 26, the channel being yieldingly compressed. At the same time the channel serves as a gutter surrounding the door opening.

While particular constructions have been described in detail, it is not my intention to limit the scope of the invention to those particular constructions, or otherwise than by the terms of the appended claims.

I claim:

1. A vehicle having a body provided with a door frame portion formed with an opening for a door and having a part peripherally surrounding the opening and in a plane paralleling the door but spaced inwardly from the exterior of the body and which is surrounded by an outwardly extending overhanging section connecting it to the exterior portion of the body, and provided with a door movable into and out of said opening and having a flange paralleling and spaced from said part and merging into the curvature of the exterior of the body when the door is closed, in combination with a combination seal and gutter compressed yieldingly between said part and said flange when the door is closed and which is formed as a channel facing outwardly from the center of the door having one of its sides engaging said part and its other side engaging the flange.

2. A vehicle having a body provided with a door frame portion formed with an opening for a door and having a part peripherally surrounding the opening and in a plane paralleling the door but spaced inwardly from the exterior of the body and which is surrounded by an outwardly-extending overhanging section connecting it to the exterior portion of the body, and provided with a door movable into and out of said opening and having a flange paralleling and spaced from said part and merging into the curvature of the exterior of the body when the door is closed, in combination with a combination seal and gutter compressed yieldingly between said part and said flange when the door is closed and which is formed as a channel facing outwardly from the center of the door, said channel being of rubber material having imbedded therein an open-mesh spring-wire reinforcement having one of its sides engaging said part and its other side engaging the flange.

3. A vehicle having a body provided with a door frame portion formed with an opening for a door and having a part peripherally surrounding the opening and in a plane paralleling the door but spaced inwardly from the exterior of the body and which is surrounded by an outwardly-extending overhanging section connecting it to the exterior portion of the body, and provided with a door movable into and out of said opening and having a flange paralleling and spaced from said part and merging into the curvature of the exterior of the body when the door is closed, in combination with a combination seal and gutter compressed yieldingly between said part and said flange when the door is closed and which is formed as a channel facing outwardly from the center of the door, said channel being of rubber material having imbedded therein a braid of wires of spring steel each extending the full length of the braid and carried diagonally back and forth across the braid over and under the other wires having one of its sides engaging said part and its other side engaging the flange.

CLAYTON C. HARRAH.